United States Patent
Wiederhold et al.

(10) Patent No.: US 12,486,210 B2
(45) Date of Patent: Dec. 2, 2025

(54) METHOD FOR THE PREPARATION OF 1,2-PROPANEDIOL

(71) Applicant: Evonik Operations GmbH, Essen (DE)

(72) Inventors: Holger Wiederhold, Darmstadt (DE); David Bolz, Frankfurt (DE); Patrik Glatz, Freigericht (DE)

(73) Assignee: Evonik Operations GmbH, Essen (DE)

( * ) Notice: Subject to any disclaimer, the term of this patent is extended or adjusted under 35 U.S.C. 154(b) by 487 days.

(21) Appl. No.: 18/249,984

(22) PCT Filed: Oct. 7, 2021

(86) PCT No.: PCT/EP2021/077669
§ 371 (c)(1),
(2) Date: Apr. 21, 2023

(87) PCT Pub. No.: WO2022/084050
PCT Pub. Date: Apr. 28, 2022

(65) Prior Publication Data
US 2023/0382834 A1      Nov. 30, 2023

(30) Foreign Application Priority Data
Oct. 21, 2020 (EP) .................... 20203021

(51) Int. Cl.
*C07C 29/48* (2006.01)
*C07C 29/86* (2006.01)

(52) U.S. Cl.
CPC .............. *C07C 29/48* (2013.01); *C07C 29/86* (2013.01)

(58) Field of Classification Search
CPC ......... C07C 29/48; C07C 29/86; C07C 29/94; C07C 31/205; B01J 27/188; B01J 31/0237
See application file for complete search history.

(56) References Cited

U.S. PATENT DOCUMENTS

| 5,616,817 | A | 4/1997 | Schuster et al. |
| 10,214,471 | B2 | 2/2019 | Wiederhold et al. |
| 2018/0354878 | A1 | 12/2018 | Wiederhold et al. |

FOREIGN PATENT DOCUMENTS

| CN | 103880783 | 6/2016 |
| WO | 2005/074637 | 8/2005 |
| WO | 2017/089075 | 6/2017 |

OTHER PUBLICATIONS

Indian Office Action dated Jul. 12, 2023, in Indian Application No. 202347034911, with English translation, 5 pages.
International Search Report dated Dec. 21, 2021, in PCT/EP2021/077669, 5 pages.
Written Opinion dated Dec. 21, 2021, in PCT/EP2021/077669, 7 pages.
U.S. Appl. No. 18/249,724, filed Apr. 19, 2023, Wiederhold, et al.
U.S. Appl. No. 18/249,980, filed Apr. 21, 2023, Wiederhold, et al.
U.S. Appl. No. 18/249,584, filed Apr. 19, 2023, Wiederhold, et al.
U.S. Appl. No. 18/249,695, filed Apr. 19, 2023, Wiederhold, et al.
U.S. Appl. No. 18/249,729, filed Apr. 19, 2023, Bolz et al.
U.S. Appl. No. 18/249,908, filed Apr. 20, 2023, Wiederhold, et al.
U.S. Appl. No. 18/249,982, filed Apr. 21, 2023, Wiederhold, et al.
U.S. Appl. No. 18/249,660, filed Apr. 19, 2023, Wiederhold, et al.
U.S. Appl. No. 18/249,906, filed Apr. 20, 2023, Wiederhold, et al.
U.S. Appl. No. 18/249,825, filed Apr. 20, 2023, Wiederhold, et al.

*Primary Examiner* — Deborah D Carr
(74) *Attorney, Agent, or Firm* — Grüneberg and Myers PLLC

(57) ABSTRACT

A method for preparing 1,2-propanediol involves continuously reacting propene with hydrogen peroxide in the presence of a catalyst mixture, containing a quaternary ammonium salt and a polytungstophosphate, in a liquid reaction mixture containing an aqueous phase with a maximum apparent pH of 6 and an organic phase containing an alkylaromatic hydrocarbon solvent. The method then involves withdrawing the liquid reaction mixture from the reaction and adding a water-soluble sulfate salt or sulfuric acid to provide a mixture containing from 500 to 10,000 mg/kg of sulfate ions in the aqueous phase. The method further involves separating the mixture obtained into an aqueous phase ($P_a$) containing 1,2-propanediol and an organic phase ($P_o$), recycling at least a part of the organic phase ($P_o$) to the reaction, and recovering 1,2-propanediol from the aqueous phase ($P_a$). The method allows for extended operation of the reaction with little loss of tungsten and phase transfer catalyst.

16 Claims, No Drawings

METHOD FOR THE PREPARATION OF 1,2-PROPANEDIOL

CROSS-REFERENCE TO RELATED APPLICATIONS

This application is a National Stage entry under § 371 of International Application No. PCT/EP2021/077669, filed on Oct. 7, 2021, and which claims the benefit of priority to European Application No. 20203021.9, filed on Oct. 21, 2020. The content of each of these applications is hereby incorporated by reference in its entirety.

BACKGROUND OF THE INVENTION

Field of the invention

The present invention relates to a method for the preparation of 1,2-propanediol by reacting propene with hydrogen peroxide.

Description of Related Art

In a well-established process used in the industry, 1,2-propanediol is prepared by reacting propene oxide with water. Propene oxide can be made on an industrial basis using the HPPO process comprising the reaction of propene with hydrogen peroxide in the presence of a titanium zeolite catalyst and an organic solvent. Propene oxide is then isolated and purified prior to the step of reacting it with water to make 1,2-propanediol.

WO 2017/089075 discloses a method for producing 1,2-propanediol from propene and hydrogen peroxide comprising: a) reacting propene with hydrogen peroxide in the presence of a catalyst mixture comprising a phase transfer catalyst and a heteropolytungstate, wherein the reaction is carried out in a liquid mixture comprising an aqueous phase with a maximum pH of 6 and an organic phase, b) dividing the two-phase mixture from step a) into an aqueous phase and an organic phase containing propylene oxide, c) returning the propylene oxide contained in the separated organic phase into the reaction from step a) and d) separating 1,2-propanediol from the aqueous phase separated in step b). The phase transfer catalyst may be a quaternary ammonium salt, a tertiary amine or a quaternary phosphonium salt.

The preferred phase transfer catalysts of WO 2017/089075 comprise a tertiary or quaternary ammonium ion of the structure $R^1R^2R^3R^4N^+$, where $R^1$ is a Y—O(C=O)$R^5$ group with Y being $CH_2CH_2$, $CH(CH_3)CH_2$ or $CH_2CH(CH_3)$ and $R^5$ being an alkyl group or alkenyl group having 11 to 21 carbon atoms, $R^2$ is hydrogen or an alkyl group having 1 to 4 carbon atoms, and $R^3$ and $R^4$ are each independently $R^1$, an alkyl group having 1 to 4 carbon atoms or Y—OH. These quaternary ammonium ester salts are preferred for extracting a large fraction of tungstate into the organic phase of the reaction mixture.

Example 8 of WO 2017/089075 discloses a continuous process using trioctylamine as phase transfer catalyst in an alkylaromatic hydrocarbon solvent.

The inventors of the present invention have found that the preferred quaternary ammonium salts of WO 2017/089075 suffer from hydrolysis of the Y—O(C=O)$R^5$ ester group at the reaction conditions used for propene oxidation, which leads to quaternary ammonium ions of increased water solubility. An extended continuous operation of the process with this phase transfer catalyst therefore requires permanent replenishing with fresh phase transfer catalyst.

The inventors of the present invention have also found that the when tertiary amines are used as phase transfer catalyst, an oxidation of the tertiary amine to the corresponding amine oxide occurs as a side reaction. An extended continuous operation of the process with a tertiary amine as phase transfer catalyst therefore also requires permanent replenishing with fresh phase transfer catalyst.

The inventors of the present invention have further found that replenishing with fresh phase transfer catalyst will still be necessary if the quaternary ammonium ester salt of WO 2017/089075 or a tertiary amine is replaced by a quaternary ammonium salt, because phase separation in step b) of the process then leads to a turbid aqueous phase with emulsified droplets of organic phase and substantial amounts of phase transfer catalyst and tungstate will be lost from the process with the aqueous phase.

Therefore, there is a need for reducing the losses of phase transfer catalyst and tungstate from the process during extended continuous operation of the process of WO 2017/089075.

SUMMARY OF THE INVENTION

The inventors of the present invention have now found that the process of WO 2017/089075 can be operated continuously for a long time period with little loss of phase transfer catalyst and of tungstate from the process by carrying out step a) of the process with a quaternary ammonium salt as the phase transfer catalyst using an alkylaromatic hydrocarbon solvent when combined with adding sodium sulfate to the aqueous phase of the resulting reaction mixture, which improves phase separation and reduces loss of phase transfer catalyst and tungstate with the separated aqueous phase.

Subject of the invention is therefore a method for the preparation of 1,2-propanediol comprising the steps:

a) continuously reacting propene with hydrogen peroxide in the presence of a catalyst mixture comprising a quaternary ammonium salt and a polytungstophosphate in a liquid reaction mixture comprising an aqueous phase with a maximum apparent pH of 6 and an organic phase comprising an alkylaromatic hydrocarbon solvent;

b) withdrawing liquid reaction mixture from step a) and adding a water-soluble sulfate salt or sulfuric acid to the withdrawn reaction mixture to provide a mixture comprising from 500 to 10,000 mg/kg of sulfate ions in the aqueous phase;

c) separating the mixture obtained in step b) into an aqueous phase ($P_a$) comprising 1,2-propanediol and an organic phase ($P_o$) comprising alkylaromatic hydrocarbon solvent, quaternary ammonium salt and polytungstophosphate;

d) recycling at least a part of the organic phase ($P_o$) to the reaction step a); and e) recovering 1,2-propanediol from the aqueous phase ($P_a$).

Preferably, sodium sulfate is added in step b).

DETAILED DESCRIPTION OF THE INVENTION

In the method of the present invention, propene is reacted in a step a) with hydrogen peroxide in the presence of a catalyst mixture comprising a quaternary ammonium salt and a polytungstophosphate. This reaction is carried out continuously in a liquid reaction mixture which comprises an aqueous phase with a maximum apparent pH of 6 and an organic phase comprising an alkylaromatic hydrocarbon solvent.

Propene can be used in pure form or in a mixture with propane, wherein the proportion of propane may be up to 20 mol-%. The proportion of propane in the propene used is preferably less than 5 mol-%. Propene is preferably employed in a molar excess to hydrogen peroxide. Preferably, the molar ratio of propene introduced to step a) to hydrogen peroxide introduced to step a) is from 1.2:1 to 5:1, more preferably from 1.5:1 to 3:1.

Hydrogen peroxide is preferably used in the form of an aqueous solution, preferably with a hydrogen peroxide content of 10 to 80% by weight, particularly preferably 30 to 70% by weight. Any commercially available grade of aqueous hydrogen peroxide solutions can be used. A crude hydrogen peroxide product obtained in the extraction stage of the anthraquinone process for producing hydrogen peroxide may also be used.

The catalyst mixture used in step a) comprises a polytungstophosphate. Polytungstophosphates are well known to a person skilled in the art. Preferred polytungstophosphates have a molar ratio of phosphorus to tungsten in the range of from 1:2 to 1:12. The polytungstophosphate is preferably generated in situ by combining phosphoric acid and sodium tungstate, which can be carried out in the liquid reaction mixture itself or prior to adding the polytungstophosphate to the liquid reaction mixture. Phosphoric acid and sodium tungstate are preferably employed at a molar ratio of phosphorus to tungsten in the range of from 1:2 to 10:1, preferably from 4:1 to 8:1. The heteropolytungstate reacts with hydrogen peroxide in the liquid reaction mixture to form peroxotungstates and peroxotungstophosphates, for example $Pa_4[WO(O_2)_2]_4^{3-}$ and $HPO_4[WO(O_2)_2]_2^{2-}$ as well as partially protonated forms thereof, which are presumably the catalytically active species for oxidizing propene.

The catalyst mixture used in step a) also comprises a quaternary ammonium salt, which acts as a phase transfer catalyst by forming a salt with a peroxotungstate or heteropolyperoxotungstate, which salt is soluble in the organic phase of the liquid reaction mixture. The phase transfer catalyst preferably comprises a singly-charged quaternary ammonium salt. Suitable counterions for the quaternary ammonium ion are chloride, bromide, nitrate, sulphate, hydrogen phosphate, dihydrogen phosphate, methyl sulfonate, methyl sulphate and ethyl sulphate. The quaternary ammonium salt is preferably used in an amount which results in a molar ratio in the liquid mixture of quaternary ammonium salt to tungsten in the range of from 0.2:1 to 3:1 and particularly preferably of from 0.4:1 to 1:1, where the molar ratio refers to the cations in the employed quaternary ammonium salt and to the employed amount of tungsten.

In a preferred embodiment, the quaternary ammonium salt comprises in total at least 12 carbon atoms, preferably from 12 to 60 carbon atoms. Preferred are tetraalkylammonium salts. Suitable quaternary ammonium salts are for example dodecyltrimethylammonium salts, hexadecyltrimethylammonium salts, octadecyltrimethylammonium salts, methyltributylammonium salts and methyltrioctylammonium salts. More preferably, the quaternary ammonium salt comprises quaternary ammonium ion having the structure $R^1R^2R^3NR^{4+}$, wherein $R^1$, $R^2$ and $R^3$ are the same or different and are each selected from alkyl groups having from 8 to 10 carbon atoms and $R^4$ is methyl. Most preferably, the phase transfer catalyst comprises methyltri(octyl/decyl)ammonium methylsulfate (CAS No. 2387913-24-6).

The reaction of step a) is carried out in a liquid reaction mixture which comprises two liquid phases, an aqueous phase with a maximum apparent pH of 6 and an organic phase. The term "apparent pH" here refers to a value determined by measurement with a glass electrode employing a commercial pH meter calibrated with aqueous buffer solutions of known pH for measuring dilute aqueous solutions. This apparent pH differs from the notional pH, i.e. the negative logarithm of the hydrogen ion activity, by a constant value because the normal potential of the glass electrode in the aqueous phase of the reaction mixture, which comprises hydrogen peroxide and glycols, is different than the normal potential in pure water. The apparent pH of the aqueous phase is preferably maintained in the range from 1.0 to 3.5, particularly preferably in the range from 2.0 to 3.0. The apparent pH can be maintained in this range by addition of acid, preferably sulphuric acid or phosphoric acid, or by addition of base, preferably aqueous sodium hydroxide solution. Adjusting the apparent pH in the preferred range provides high selectivity for 1,2-propanediol and prevents enriching propene oxide in the aqueous phase, which simplifies the subsequent separation of propylene glycols from the aqueous phase.

In the reaction step a) the weight ratio of hydrogen peroxide to water fed to step a) is preferably adjusted while maintaining a molar excess of propene to hydrogen peroxide fed to step a). The weight ratio of hydrogen peroxide to water is preferably varied within the range of from 0.05 to 1.5, more preferably from 0.10 to 0.7 and most preferably from 0.15 to 0.45. The molar ratio of propene to hydrogen peroxide fed to step a) is preferably from 1.1:1 to 10:1, more preferably from 1.2:1 to 4:1.

The reaction is preferably conducted at a temperature in the range of from 50 to 110° C., more preferably 60 to 100° C. and particularly preferably 70 to 90° C. The reaction pressure is preferably higher than the vapor pressure of propene at the reaction temperature to ensure that most of the propene and preferably all of the propene is present in the liquid organic phase of the liquid reaction mixture.

The reaction of step a) can is carried with an organic phase comprising an alkylaromatic hydrocarbon solvent. The reaction is preferably conducted in the presence of at least one organic The alkylaromatic hydrocarbon solvent preferably has a boiling point of more than 120° C. and preferably has a solubility in water of less than 250 mg/kg at 20° C. Suitable as solvents are alcohols having one or more hydroxyl groups, ethers, esters, ketones and alkylated aromatic hydrocarbons. Preferably the amount of alkylaromatic hydrocarbon solvent is selected to provide a proportion of alkylaromatic hydrocarbon solvent in the organic phase during the reaction in the range of from 10 to 90% by weight.

Preferred are alkylaromatic hydrocarbon solvents having from 7 to 12 carbon atoms. Suitable alkylated aromatic hydrocarbons are, for example, toluene, 1,2-dimethylbenzene (o-xylene), 1,3-dimethylbenzene (m-xylene), 1,4-dimethylbenzene (p-xylene), ethylbenzene, 1,2,3-trimethylbenzene, 1,2,4-trimethylbenzene, 1,3,5-trimethylbenzene (mesitylene), 1-ethyl-2-methylbenzene, 1-ethyl-3-methylbenzene and 1-ethyl-4-methylbenzene and n-propylbenzene. Preferably, alkylaromatic hydrocarbon solvents comprising more than 50% by weight, particularly preferably more than 80% by weight, of alkylated aromatic hydrocarbons having from 7 to 12 carbon atoms are used. The use of these solvents enables extracting most of the peroxotungstates into the organic phase of the reaction mixture and recycling them, which allows for operating the process without a need for recovering polytungstophosphate from the aqueous phase of the reaction mixture of step a). The quaternary ammonium salt, the molar ratio of quaternary ammonium salt to polytungstophosphate, the molar ratio of phosphorous atoms of the polytungstophosphate to tungsten, the molar ratio of propene to hydrogen peroxide and the amount of alkylaromatic hydrocarbon solvent are then preferably selected to transfer as much as possible of the tungsten present in the liquid reaction mixture into the organic phase.

The quaternary ammonium salt, the polytungstophosphate and the alkylaromatic hydrocarbon solvent can be added in step a) of the method of the present invention separately or in the form of mixtures containing two or all three of these components. Preferably, the quaternary ammonium salt and the polytungstophosphate are added dissolved in an organic phase comprising the alkylaromatic hydrocarbon solvent.

The reaction of step a) may be carried out in the presence of phosphoric acid. The concentration of phosphoric acid and phosphates in the aqueous phase ($P_a$) of the reaction mixture is preferably from 500 to 30,000 mg/kg, calculated as orthophosphate. Phosphoric acid may be used to provide an apparent pH of the aqueous phase ($P_a$) of the reaction mixture of from 1.0 to 3.5, preferably of from 2.0 to 3.0. Phosphoric acid may also be present from in situ formation of a polytungstophosphate in the aqueous phase ($P_a$) of the reaction mixture as described above.

The reaction of step a) may be carried out in batch or continuously, with a continuous reaction being preferred. The concentration of hydrogen peroxide in the aqueous phase is preferably maintained in the range of 0.1 to 5% by weight, particularly preferably 0.5 to 3% by weight. The concentration of hydrogen peroxide can be adjusted in this range by appropriate selection of the reaction temperature, the molar ratio of propene to hydrogen peroxide and the residence time of the liquid mixture in the reactor in which the reaction takes place. The residence time of the reaction mixture is preferably adjusted to maintain a hydrogen peroxide conversion in the range of from 80 to 99%.

During the reaction, the liquid mixture is preferably mixed in order to generate a large phase interface between the aqueous phase and the organic phase. For this purpose, the reaction is preferably carried out continuously in a loop reactor which has fixed internals in a tubular section and the liquid mixture is passed through the loop reactor at a flow rate which generates a turbulent flow at the internals. Baffles, static mixing elements, structured packings or random packings can be used as internals for this purpose. In combination to these internals or as an alternative, heat exchangers, such as plate heat exchangers or tube bundle heat exchangers, may be used, in which turbulent flow is generated, for example between the plates of a plate heat exchanger or in the tubes of a tube bundle heat exchanger.

Preferably, all or a part of the reaction heat generated in step a) is removed while the reaction proceeds, preferably by cooling the reaction mixture in a heat exchanger. More preferably, the reaction is carried out continuously in a loop reactor which comprises a heat exchanger within the reactor loop for cooling the reaction mixture.

In step b) of the method of the invention, liquid reaction mixture is withdrawn from step a) and a water-soluble sulfate salt or sulfuric acid is added to the withdrawn reaction mixture to provide a mixture comprising from 500 to 10,000 mg/kg of sulfate ions in the aqueous phase. Preferably, sodium sulfate is added in this step, preferably as an aqueous solution. The withdrawn reaction mixture is preferably cooled before the sulfate salt or sulfuric acid is added, preferably by 15 to 60° C. After the sulfate salt or sulfuric acid has been added, the resulting mixture is preferably passed through a mixer, preferably a static mixture, to provide a uniform concentration of sulfate in the aqueous phase of the mixture. Adding a sulfate salt or sulfuric acid in an amount providing the described concentration of sulfate ions speeds up coagulation of dispersed droplets of organic phase and splits emulsions of organic phase in the aqueous phase which can form when the concentration of phosphoric acid and phosphates in the aqueous phase of the reaction mixture is low.

In step c) of the method of the present invention, the liquid mixture obtained in step b) is separated into an aqueous phase ($P_a$) comprising 1,2-propanediol and an organic phase ($P_o$) comprising alkylaromatic hydrocarbon solvent, quaternary ammonium salt and polytungstophosphate. The separation of the two-phase reaction mixture provided by step b) is preferably carried out in a settler vessel. The two-phase reaction mixture is preferably passed through a coalescer element comprising a structured packing or a random packing with a surface wetted by the dispersed phase of the two-phase mixture in order to achieve a more complete separation.

The aqueous phase (Pa) typically comprises water, unreacted hydrogen peroxide and the reaction product 1,2-propanediol. The aqueous phase typically also contains dipropylene glycol and tripropylene glycol as well as reaction byproducts, such as 1-hydroperoxy-2-propanol and 2-hydroperoxy-1-propanol formed by reaction of propene oxide with hydrogen peroxide, and formic acid, acetic acid and hydroxyacetone formed by further oxidation of 1,2-propanediol. The aqueous phase may also comprise phosphoric acid and may further contain sodium salts of phosphoric acid if a polytungstophosphate generated in situ by combining phosphoric acid and sodium tungstate is used in step a). The organic phase ($P_o$) comprises the alkylaromatic hydrocarbon solvent as well as unreacted propene and propene oxide that is formed as intermediate when propene is reacted with hydrogen peroxide and has not been hydrolyzed to 1,2-propanediol. The organic phase ($P_o$) also comprises one or more salts formed of the polytungstophosphate and the cation of the quaternary ammonium salt. The organic phase $P_o$ will also comprise propane, if the propene starting material contains propane.

In step d) of the method of the present invention, at least a part of the separated organic phase ($P_o$) is recycled to the reaction step a). Thereby, propene oxide present in the organic phase ($P_o$) is recycled to step a) in order to achieve a complete conversion of propene to 1,2-propanediol, dipropylene glycol and tripropylene glycol. The polytungstophosphate and the quaternary ammonium salt present in the organic phase ($P_o$) is also recycled into step a), and it is particularly preferred to recycle substantially all of the catalyst mixture that is present in the organic phase into step a).

The aqueous phase ($P_a$) obtained in step c) is preferably further processed without recycling any part of it directly or indirectly to step a).

Steps a) to d) of the method of the present invention are preferably carried out continuously.

In step e) of the method of the present invention, 1,2-propanediol is recovered from the aqueous phase ($P_a$) separated in step c), preferably by distillation. Preferably, 1,2-propanediol and higher propylene glycols, like dipropylene glycol and tripropylene glycol, are recovered by a sequence of distillation steps, such as a multi-step distillation with the first distillation step and optionally further distillation steps providing an overhead product comprising water and a bottoms product which is passed to the next distillation step, and a distillation step providing an overhead product comprising 1,2-propanediol and a residuals bottoms product which is preferably subjected to at least one further distillation step. Most preferably, a sequence of distillation steps as described in Ullmann's Encyclopedia of Industrial Chemistry, online edition, entry "Propanediols", page 4, DOI 10.1002/14356007.a22_163.pub2 is used where an overhead product comprising water is separated from a bottoms product comprising 1,2-propanediol and higher propylene glycols in a series of two to four heat integrated distillation steps, followed by a vacuum distillation step which provides 1,2-propanediol as the overhead product and a bottoms product containing higher boiling organic compounds and salts. From this bottoms product, dipropylene glycol and tripropylene glycol may be recovered as overhead products in further vacuum distillation steps.

In a preferred embodiment, step e) comprises subjecting at least a part and preferably all of the aqueous phase ($P_a$) to a catalytic hydrogenation, preferably at a temperature of from 80° C. to 140° C., more preferably from 90° C. to 120° C., prior to recovering 1,2-propanediol by distillation. The hydrogenation is preferably carried out using a supported hydrogenation catalyst comprising one or more metals from the group of Ru, Rh, Pt, Ag, Ir, Fe, Cu, Ni and Co on a support, wherein activated carbon, $SiO_2$, $TiO_2$, $ZrO_2$, $Al_2O_3$ and aluminium silicates are preferred as support materials. Preference is given to supported hydrogenation catalysts comprising ruthenium as active metal. The catalytic hydrogenation is preferably carried out at a partial hydrogen pressure of 5 to 50 bar, preferably 5 to 35 bar, more preferred 7 to 30 bar, even more preferred 8 to 25 bar. The hydrogenation catalyst may be used as a suspension or as a fixed bed, a trickle bed hydrogenation with a fixed bed catalyst being preferred. The hydrogenation can prevent problems caused by decomposition of hydrogen peroxide, which has not reacted in step a), in step e) of recovering 1,2-propanediol and dipropylene glycol. The hydrogenation also converts the by-products 1-hydroperoxy-2-propanol, 2-hydroperoxy-1-propanol and hydroxyacetone formed in step a) to 1,2-propanediol and thereby improves the yield of 1,2-propanediol.

The method of the present invention preferably comprises an additional catalyst reactivating step f) of reacting a part of the organic phase ($P_o$) separated in step c) with hydrogen peroxide and phosphoric acid at a temperature of from 5 to 40° C. in a liquid mixture comprising an aqueous phase and an organic phase and recycling the organic phase ($P_{oc}$) provided by step f) to step a). Preferably, also at least a part of the aqueous phase ($P_{ac}$) resulting in step f) is passed to reaction step a).

Phosphoric acid is preferably employed in step e) at a molar ratio of phosphorus to tungsten in the range of from 1:2 to 10:1, preferably from 4:1 to 8:1. The aqueous phase of the liquid mixture of step f) preferably comprises from 10 to 40% by weight, more preferably 15 to 38% by weight and most preferred 18 to 35% by weight of phosphoric acid. Hydrogen peroxide is preferably used in an amount providing at least 2 mol hydrogen peroxide per mol tungsten, preferably from 2 to 10 mol hydrogen peroxide per mol tungsten. It is believed that the preferred molar ratio of phosphorus to tungsten and hydrogen peroxide to tungsten and the preferred concentration of phosphoric acid in the aqueous phase convert most of the tungstate to peroxotungstophosphates of formula $PO_4[WO(O_2)_2]_4^{3-}$ and $HPO_4[WO(O_2)_2]_2^{2-}$ as well as partially protonated forms thereof, which are presumably the catalytically most active species for oxidizing propene. The temperature of from 5 to 40° C. used in step f) prevents decomposition and formation of molecular oxygen from these species before they are passed to reaction step a). Preferably, step f) is conducted at a temperature of from 10 to 35° C., more preferably 15 to 30° C.

The reaction time in step f) is typically from 1 to 200 min, preferably 1 to 20 min and more preferably 2 to 10 min, with reaction times of less than 20 min being preferred at the upper end of the temperature range of from 5 to 40° C. if the liquid mixture of step f) comprises propene. Only a small part of propene present in the liquid mixture of step f) will then be oxidized, step f) can be carried out without cooling and essentially all of the peroxotungstophosphates generated in step f) can be passed to step a).

Step f) may be carried out in any kind of reactor known to be suitable for mixing the two liquid phases present in step f). Suitable reactors for carrying out step f) are stirred vessels as well as the reactor types described further above for providing a large phase interface between the aqueous phase and the organic phase in step a). For short reaction times in step f), pipe reactors with fixed internals for creating turbulent flow may also be used.

Preferably, steps a) to d) and f) are carried out continuously and from 5 to 50%, preferably 10 to 25%, of the organic phase ($P_o$) separated in step c) is passed to step f) with the remainder being recycled directly to step a). This way, the most catalytically active peroxotungstophosphate species can be continuously regenerated and step a) can be operated continuously over a long time period without a loss in catalytic activity, i.e. with constant hydrogen peroxide conversion, even at a low concentration of phosphoric acid in the aqueous phase of reaction step a).

Preferably, a tungstate is added in step f) in an amount compensating the loss of tungsten with the aqueous phase ($P_a$) separated in step c).

The present invention will now be explained in more detail with reference to an example.

EXAMPLE

Preparation of Initial Epoxidation Catalyst Solution

A mixture of 88 g 70% by weight hydrogen peroxide, 100 g demineralized water, 211 g 85% by weight phosphoric acid and 132 g sodium tungstate dihydrate was stirred for 2 h at room temperature. Then, a solution of 198 g of methyltri (octyl/decyl)ammonium methylsulfate (CAS No. 2387913-24-6) in 816 g Hydrosol A 200 ND (a mixture of C10 alkyl benzenes) was added and the mixture was stirred for another 2 h at room temperature. The aqueous and organic phases were then separated to provide 1099 g of organic phase as initial epoxidation catalyst solution.

Reaction of Propene with Hydrogen Peroxide

The reaction of propene with hydrogen peroxide was carried out at a temperature of 70° C. and a pressure of 30 bar in a loop reactor with a loop volume of 0.25 l, a circulation pump and a heat exchanger for adjusting the reaction temperature, which was operated at a circulation rate of 50 kg h$^{-1}$. The reactor was equipped with a catalyst feed reservoir and feed pumps for feeding liquid propene, liquid propane, an aqueous hydrogen peroxide solution and liquid from the catalyst feed reservoir. The initial epoxidation catalyst solution was charged to the catalyst feed reservoir. The loop initially contained reaction mixture from a previous experiment. Circulation was started and maintained at 50 kg h$^{-1}$ and the circulating mixture was heated to 70° C. Then 43 g h$^{-1}$ of propene, 27 g h$^{-1}$ of propane, 112 g h$^{-1}$ of a 15% by weight aqueous hydrogen peroxide solution containing 0.5% by weight phosphoric acid, and 171 g h$^{-1}$ of organic catalyst solution from the catalyst feed reservoir were introduced into the loop reactor, cooling the circulating mixture to maintain a reaction temperature of 70° C. A two-phase oxidation reaction mixture was removed from the loop reactor in an amount corresponding to the amounts added and 18 g h$^{-1}$ of a 4.8% by weight aqueous disodium sulfate solution was added to this mixture at the reactor outlet to speed up phase separation. The organic phase and the aqueous phase of the resulting mixture were separated using a coalescer and the organic phase was passed to the catalyst feed reservoir after depressurizing and cooling to 25° C. After about 24 h of operation, the feeding of reactants and the circulation in the loop reactor were stopped.

The aqueous phase from the final 60 min of operating the reaction was collected and analyzed for hydrogen peroxide by redox titration, for organic products by capillary GC (25 m CP-WAX-52 CB column from Agilent, He carrier gas, temperature program starting at 50° C. with ramps of 20 K/min to 90° C., 10 K/min to 220° C. and 5 K/min to 235° C., FID detector) and for tungsten by ICP-OES. The analysis showed a tungsten content of 17 mg/kg, a hydrogen peroxide conversion of 98% and concentrations of 1,2-propanediol, dipropylene glycol, tripropylene glycol and hydroxyacetone corresponding to yields of 74% 1,2-propanediol, 9% dipropylene glycol, 1% tripropylene glycol and 1% hydroxyacetone based on hydrogen peroxide fed to the loop reactor. For comparison, a sample of the two-phase reaction mixture was drawn directly from the loop of the loop reactor and allowed to stand for 0.5 h for phase separation. Analysis of the resulting aqueous phase showed a tungsten content of 6,800 mg/kg.

The example demonstrates that the addition of sodium sulfate reduced the loss of tungstate with the separated aqueous phase by a factor of about 400 down to a level which is significantly lower than the tungsten content in the aqueous phase achieved in the prior art of WO 2017/089075 (66 mg/kg in example 7, 21,000 mg/kg in example 11).

The invention claimed is:

1. A method for the preparation of 1,2-propanediol, comprising:
   a) continuously reacting propene with hydrogen peroxide in the presence of a catalyst mixture, comprising a quaternary ammonium salt and a polytungstophosphate, in a liquid reaction mixture comprising an aqueous phase with a maximum apparent pH of 6 and an organic phase comprising an alkylaromatic hydrocarbon solvent;
   b) withdrawing the liquid reaction mixture from a) and adding a water-soluble sulfate salt or sulfuric acid to the liquid reaction mixture, to obtain a mixture comprising from 500 to 10,000 mg/kg of sulfate ions in an aqueous phase;
   c) separating the mixture obtained in b) into an aqueous phase ($P_a$) comprising 1,2 propanediol and an organic phase ($P_o$);
   d) recycling at least a part of the organic phase ($P_o$) to the reaction a); and
   e) recovering the 1,2-propanediol from the aqueous phase ($P_a$),
   wherein apparent pH is a value determined by measurement with a glass electrode employing a commercial pH meter calibrated with aqueous buffer solutions of known pH for measuring dilute aqueous solutions.

2. The method of claim 1, wherein sodium sulfate is added in b).

3. The method of claim 1, wherein c) comprises passing the aqueous phase ($P_a$) through a coalescer element comprising a structured packing or a random packing with a surface wetted by the organic phase ($P_o$).

4. The method of claim 1, wherein in a), the aqueous phase comprises phosphoric acid and/or phosphate salt in a total amount of from 500 to 30,000 mg/kg, calculated as an orthophosphate.

5. The method of claim 1, wherein in a), a concentration of the hydrogen peroxide in the aqueous phase is from 0.1 to 5% by weight.

6. The method of claim 1, wherein a molar ratio of the propene introduced to a) to the hydrogen peroxide introduced to a) is from 1.2:1 to 5:1.

7. The method of claim 1, wherein the alkylaromatic hydrocarbon solvent comprises more than 50% by weight of an alkylated aromatic hydrocarbon having from 7 to 12 carbon atoms.

8. The method of claim 1, wherein a) is conducted continuously in a loop reactor comprising fixed internals in a tubular section, and the liquid reaction mixture is passed through the loop reactor at a flow rate sufficient to provide turbulent flow at said fixed internals.

9. The method of claim 1, wherein the quaternary ammonium salt is a tetraalkylammonium salt.

10. The method of claim 9, wherein the tetraalkylammonium salt has the structure $R^1R^2R^3NR^{4\,+}$, wherein
   $R^1$, $R^2$, and $R^3$ are the same or different and are each an alkyl group having from 8 to 10 carbon atoms, and
   $R^4$ is methyl.

11. The method of claim 1, further comprising:
   f) reacting a part of the organic phase ($P_o$) separated in c) with hydrogen peroxide and phosphoric acid, at a temperature of from 5 to 40° C., in a further liquid mixture comprising an aqueous phase ($P_{ac}$) and an organic phase ($P_{oc}$), and recycling the organic phase ($P_{oc}$) to a).

12. The method of claim 11, wherein a tungstate is added in f) to compensate for a loss of tungsten from the aqueous phase ($P_a$) separated in c).

13. The method of claim 1, wherein in a), the propene is reacted with the hydrogen peroxide at a temperature of from 50 to 110° C.

14. The method of claim 1, wherein a) to d) are carried out continuously.

15. The method of claim 6, wherein the molar ratio of the propene introduced to a) to the hydrogen peroxide introduced to a) is from 1.5:1 to 3:1.

16. The method of claim 7, wherein the alkylaromatic hydrocarbon solvent comprises more than 80% by weight of the alkylated aromatic hydrocarbon.

* * * * *